US010324880B1

United States Patent
Dufresne et al.

(10) Patent No.: US 10,324,880 B1
(45) Date of Patent: Jun. 18, 2019

(54) FABRIC MANAGEMENT SYSTEM AND METHOD

(71) Applicant: EMC IP Holding Company LLC, Hopkinton, MA (US)

(72) Inventors: Daniel Dufresne, Salem, NH (US); Matthew Mullins, Upton, MA (US); Antonio Fontes, Northbridge, MA (US); Patrick J. Weiler, Northborough, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 68 days.

(21) Appl. No.: 15/386,651

(22) Filed: Dec. 21, 2016

Related U.S. Application Data (63) Continuation-in-part of application No. 15/273,177, filed on Sep. 22, 2016, now Pat. No. 10,235,316.

(51) Int. Cl.
*G06F 13/40* (2006.01)
*G06F 13/42* (2006.01)

(52) U.S. Cl.
CPC ...... *G06F 13/4022* (2013.01); *G06F 13/4068* (2013.01); *G06F 13/4282* (2013.01); *G06F 2213/0026* (2013.01)

(58) Field of Classification Search
CPC ...... G06F 13/00; G06F 13/14; G06F 13/4022; G06F 13/4221
See application file for complete search history.

(56) References Cited

U.S. PATENT DOCUMENTS

| 8,429,325 | B1* | 4/2013 | Onufryk | G06F 13/4022 710/312 |
| 2011/0219164 | A1* | 9/2011 | Suzuki | G06F 13/12 710/316 |
| 2012/0144087 | A1* | 6/2012 | Buckland | G06F 13/4068 710/316 |
| 2012/0144230 | A1 | 6/2012 | Buckland et al. | |
| 2012/0265912 | A1* | 10/2012 | Hess | G06F 13/126 710/301 |
| 2013/0246683 | A1* | 9/2013 | Natrajan | G06F 11/3051 710/316 |
| 2015/0254202 | A1* | 9/2015 | McGlone | G06F 1/3278 710/316 |
| 2015/0370749 | A1 | 12/2015 | Yu | |

OTHER PUBLICATIONS

Non-Final Office Action issued in Application U.S. Appl. No. 15/273,177 dated Apr. 6, 2018.
Non-Final Office Action issued in Application U.S. Appl. No. 15/386,378 dated Apr. 5, 2018.
Non-Final Office Action issued in Application U.S. Appl. No. 15/386,736 dated Apr. 5, 2018.

\* cited by examiner

*Primary Examiner* — Idriss N Alrobaye
*Assistant Examiner* — Getente A Yimer
(74) *Attorney, Agent, or Firm* — Brian J. Colandreo; Heath M. Sargeant; Holland & Knight LLP (57) ABSTRACT

A PCIe fabric is configured to couple a plurality of elements. The PCIe fabric includes a plurality of PCIe subfabrics. A primary master central processing system is configured to couple the plurality of PCIe subfabrics and includes a primary master central processing unit.

18 Claims, 8 Drawing Sheets

FABRIC MANAGEMENT SYSTEM AND METHOD

RELATED CASE(S)

This application is a continuation-in-part of and claims the benefit of U.S. Ser. No. 15/273,177, entitled "Fabric Management System and Method", filed on 22 Sep. 2016, which is incorporated herein by reference in its entirety.

TECHNICAL FIELD

This disclosure relates to fabric systems and, more particularly, to fabric systems that include a plurality of subfabrics.

BACKGROUND

Storing and safeguarding electronic content is of paramount importance in modern business. Accordingly, various systems and methodologies may be employed to protect such electronic content.

The use of redundant high-availability storage systems is increasing in popularity. Unfortunately, even redundant systems may fail during the course of normal operation. And when such redundant systems fail, the above-described electronic content may be lost. Accordingly and while failure cannot be avoided, planning appropriately for such failure may mitigate any adverse impact.

SUMMARY OF DISCLOSURE

In a first implementation, a PCIe fabric is configured to couple a plurality of elements. The PCIe fabric includes a plurality of PCIe subfabrics. A primary master central processing system is configured to couple the plurality of PCIe subfabrics and includes a primary master central processing unit.

One or more of the following features may be included. The primary master central processing system may include a primary fan-out switch configured to electrically couple the primary master central processing unit and the plurality of PCIe subfabrics. A secondary master central processing system may be configured to couple the plurality of PCIe subfabrics and may include a secondary master central processing unit. The secondary master central processing system may include a secondary fan-out switch configured to electrically couple the secondary master central processing unit and the plurality of PCIe subfabrics. The primary master central processing system may be configured to determine the topology of the plurality of PCIe subfabrics. Each of the plurality of PCIe subfabrics may include a managing central processing unit and a PCIe fabric switch. One or more communication paths may be configured to allow communication between the PCIe fabric switch included within each of the plurality of PCIe subfabrics. Determining the topology of the plurality of PCIe subfabrics may include determining the number of managing central processing units included within the PCIe fabric and determining the types of elements coupled with the PCIe fabric. The plurality of elements may include components of a data storage system. The plurality of elements may include one or more host elements. The one or more host elements may include one or more compute modules. The plurality of elements may include one or more endpoint elements. The one or more endpoint elements may include one or more of: one or more host bus adaptors; SAS controllers; SAS hard disk drives; fiber channel adapters; Ethernet adapters; PCIe flash memory devices; one or more InfiniBand (TB) adapters; one or more RAID adapters; one or more network adapters; and one or more general purpose graphics processing units.

In another implementation, a PCIe fabric is configured to couple a plurality of elements. The PCIe fabric includes a plurality of PCIe subfabrics. A primary master central processing system is configured to couple the plurality of PCIe subfabrics and includes a primary master central processing unit and a primary fan-out switch configured to electrically couple the primary master central processing unit and the plurality of PCIe subfabrics. The primary master central processing system is configured to determine the topology of the plurality of PCIe subfabrics. Each of the plurality of PCIe subfabrics includes a managing central processing unit and a PCIe fabric switch.

One or more of the following features may be included. One or more communication paths may be configured to allow communication between the PCIe fabric switch included within each of the plurality of PCIe subfabrics. A secondary master central processing system may be configured to couple the plurality of PCIe subfabrics and may includes a secondary master central processing unit. The secondary master central processing system may include a secondary fan-out switch configured to electrically couple the secondary master central processing unit and the plurality of PCIe subfabrics.

In another implementation, a PCIe fabric is configured to couple a plurality of elements. The PCIe fabric includes a plurality of PCIe subfabrics. A primary master central processing system is configured to couple the plurality of PCIe subfabrics and includes a primary master central processing unit and a primary fan-out switch configured to electrically couple the primary master central processing unit and the plurality of PCIe subfabrics. A secondary master central processing system is configured to couple the plurality of PCIe subfabrics and includes a secondary master central processing unit and a secondary fan-out switch configured to electrically couple the secondary master central processing unit and the plurality of PCIe subfabrics. One or more communication paths is configured to allow communication between the PCIe fabric switch included within each of the plurality of PCIe subfabrics.

One or more of the following features may be included. The plurality of elements may includes one or more host elements. The plurality of elements may includes one or more endpoint elements.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
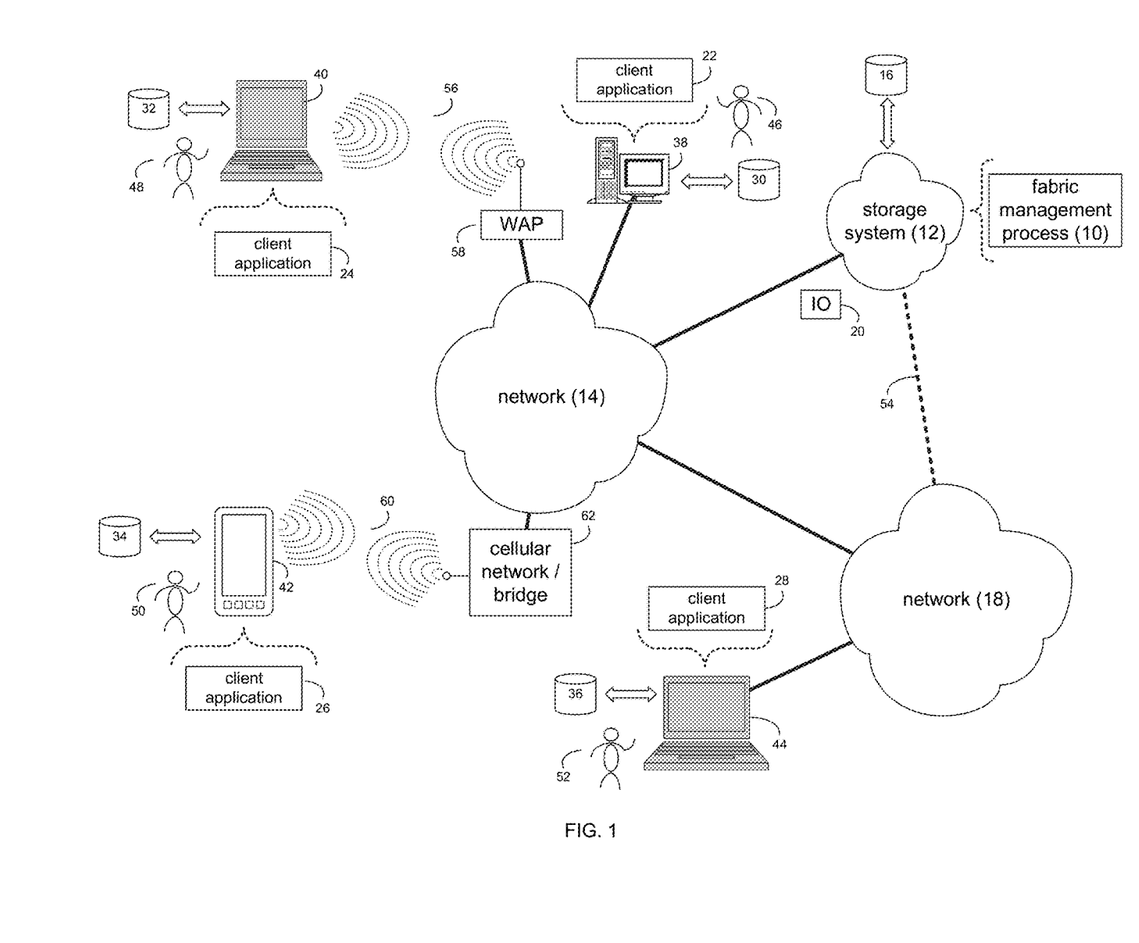
FIG. 1 is a diagrammatic view of a storage system and a fabric management process coupled to a distributed computing network.

System Overview:

Referring to FIG. 1, there is shown fabric management process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft Windows Server™; Redhat Linux™, Unix, or a custom operating system, for example.

The instruction sets and subroutines of fabric management process 10, which may be stored on storage device 16 included within storage system 12, may be executed by one or more processors (not shown) and one or more memory architectures (not shown) included within storage system 12. Examples of storage device 16 may include but is not limited to: a hard disk drive; a tape drive; an optical drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (i.e. a request that content be written to storage system 12) and data read requests (i.e. a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices (e.g., client electronic devices 38, 40, 42, 44) may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft Windows™, Apple Macintosh™, Redhat Linux™, or a custom operating system.

For illustrative purposes, storage system 12 will be described as being a network-based storage system that includes a plurality of backend storage devices. However, this is for illustrative purposes only and is not intended to be a limitation of this disclosure, as other configurations are possible and are considered to be within the scope of this disclosure.

Figure 2:
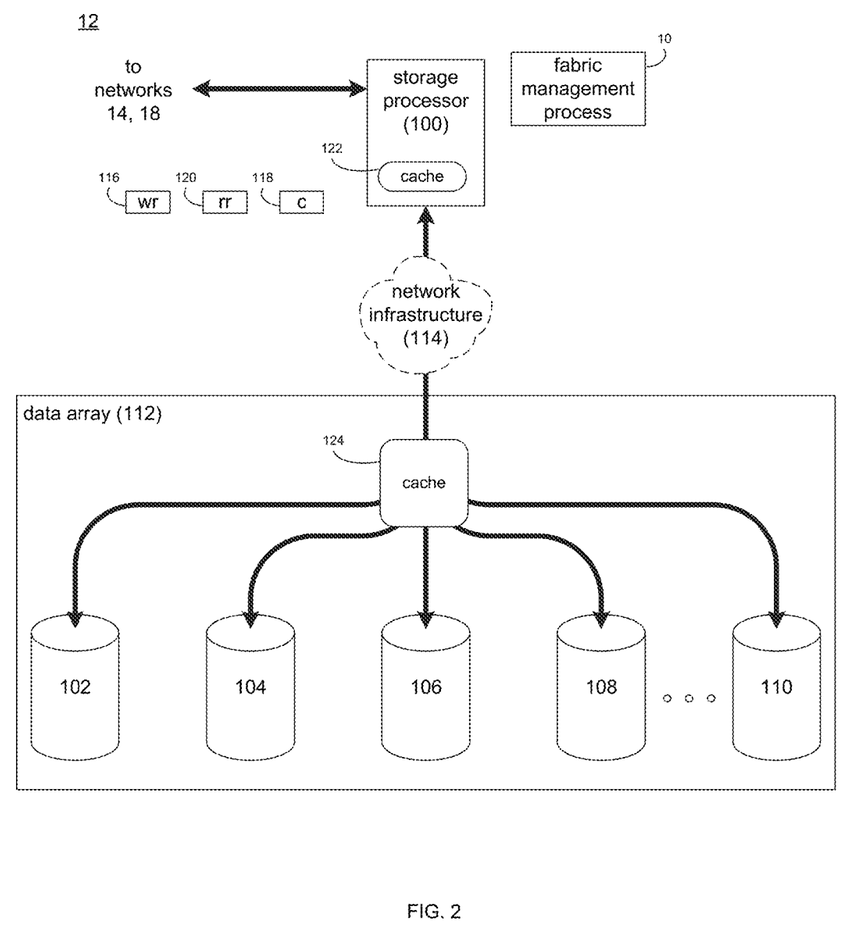
FIG. 2 is a diagrammatic view of the storage system of FIG. 1.

Data Storage System:

Referring also to FIG. 2, there is shown a general implementation of storage system 12. In this general implementation, data storage system 12 may include storage processor 100 and a plurality of storage targets (e.g. storage targets 102, 104, 106, 108, 110). Storage targets 102, 104, 106, 108, 110 may be configured to provide various levels of performance and/or high availability. For example, one or more of storage targets 102, 104, 106, 108, 110 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108, 110 may be configured as a RAID 1 array, in which data is mirrored between storage targets. By mirroring data between storage targets, a level of high availability is achieved as multiple copies of the data are stored within storage system 12.

While storage targets 102, 104, 106, 108, 110 are discussed above as being configured in a RAID 0 or RAID 1 array, this is for illustrative purposes only and is not intended to be a limitation of this disclosure, as other configurations are possible. For example, storage targets 102, 104, 106, 108, 110 may be configured as a RAID 3, RAID 4, RAID 5, RAID 6 or RAID 7 array.

While in this particular example, storage system 12 is shown to include five storage targets (e.g. storage targets 102, 104, 106, 108, 110), this is for illustrative purposes only and is not intended to be a limitation of this disclosure.

Specifically, the actual number of storage targets may be increased or decreased depending upon e.g. the level of redundancy/performance/capacity required.

One or more of storage targets 102, 104, 106, 108, 110 may be configured to store coded data, wherein such coded data may allow for the regeneration of data lost/corrupted on one or more of storage targets 102, 104, 106, 108, 110. Examples of such coded data may include but is not limited to parity data and Reed-Solomon data. Such coded data may be distributed across all of storage targets 102, 104, 106, 108, 110 or may be stored within a specific storage device.

Examples of storage targets 102, 104, 106, 108, 110 may include one or more electro-mechanical hard disk drives and/or solid-state/flash devices, wherein a combination of storage targets 102, 104, 106, 108, 110 and processing/control systems (not shown) may form data array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108, 110 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108, 110 may be a RAID device and/or computer-based hard disk drives. Further still, one or more of storage targets 102, 104, 106, 108, 110 may be a SAN.

In the event that storage system 12 is configured as a SAN, the various components of storage system 12 (e.g. storage processor 100, storage targets 102, 104, 106, 108, 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of fabric management process 10. The instruction sets and subroutines of fabric management process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); a read-only memory (ROM); and all forms of flash memory storage devices.

As discussed above, various IO requests (e.g. IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (i.e. a request that content 118 be written to storage system 12) and data read request 120 (i.e. a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 may initially store content 118 within frontend cache memory system 122. Depending upon the manner in which frontend cache memory system 122 is configured, storage processor 100 may immediately write content 118 to data array 112 (if frontend cache memory system 122 is configured as a write-through cache) or may subsequently write content 118 to data array 112 (if frontend cache memory system 122 is configured as a write-back cache).

Data array 112 may include backend cache memory system 124. Examples of backend cache memory system 124 may include but are not limited to a volatile, solid-state, cache memory system (e.g., a dynamic RAM cache memory system) and/or a non-volatile, solid-state, cache memory system (e.g., a flash-based, cache memory system). During operation of data array 112, content 118 to be written to data array 112 may be received from storage processor 100. Data array 112 may initially store content 118 within backend cache memory system 124 prior to being stored on e.g. one or more of storage targets 102, 104, 106, 108, 110.

As discussed above, the instruction sets and subroutines of fabric management process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of fabric management process 10 may be executed by one or more processors (not shown) and one or more memory architectures (not shown) included within data array 112.

Modular systems are becoming increasingly granular and disaggregated, wherein the constituent parts that make up a server and/or a storage subsystem (e.g., the compute modules, network modules, and I/O modules that make up storage processor 100 and/or data array 112) may be componentized and modularized so that they can be coupled together by the end user/administrator as needed. This may be especially true in hyper-converged infrastructure implementations where e.g., all of the aforementioned subsystems/modules are brought together into a single chassis.

As will be discussed below in greater detail, such subsystems/modules may be coupled together via one or more communication fabrics, wherein such fabrics may be implemented using PCIe (PCI Express) and may be actively managed.

Figure 3:
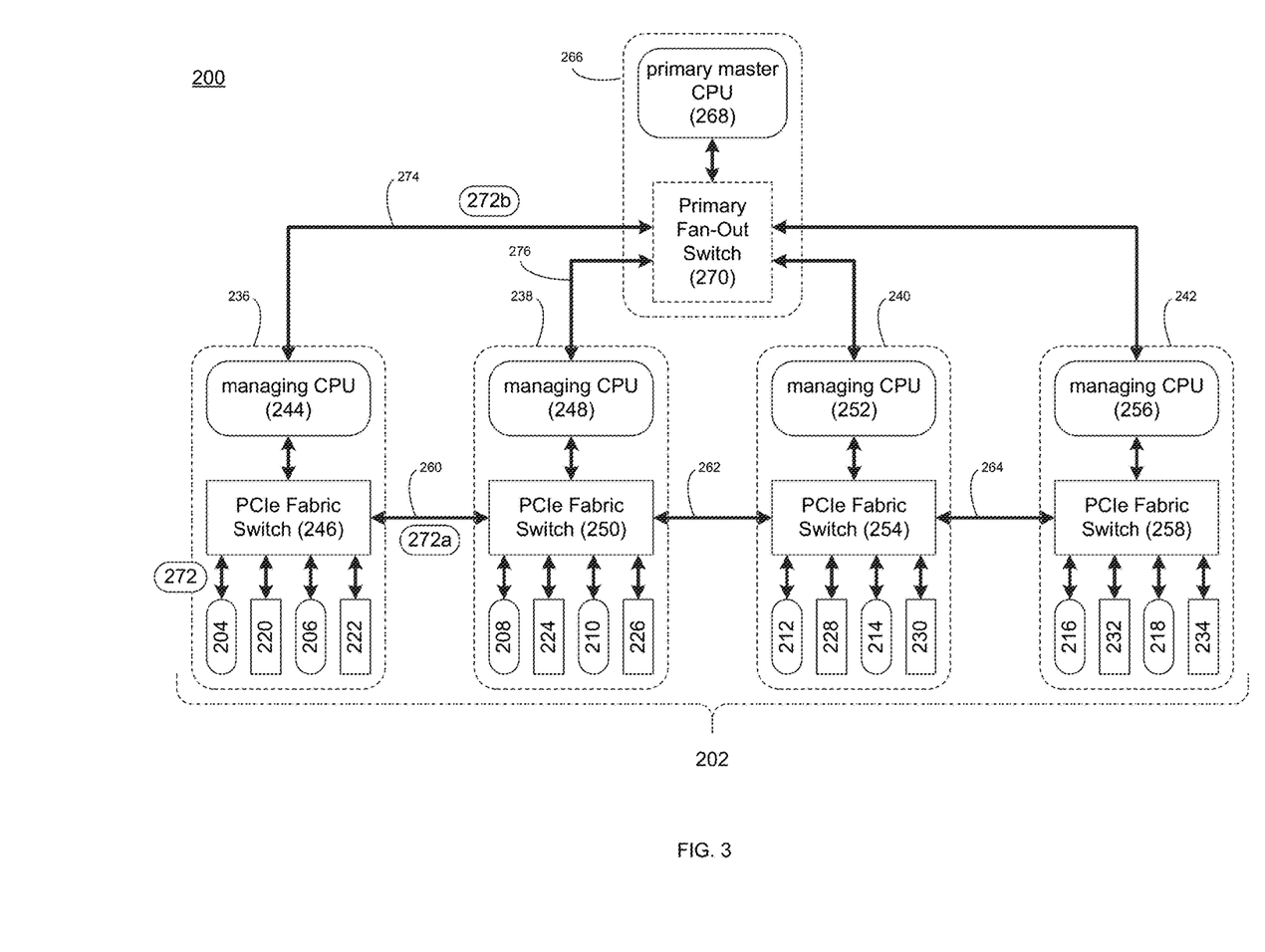
FIG. 3 is a diagrammatic view of the storage processor of FIG. 2.

Referring to FIG. 3, there is shown one implementation of such a communication fabric (e.g., PCIe fabric 200) that may be utilized within a modularized version of storage processor 100 to link together the individual subsystems/modules of storage processor 100. Additionally and while the following discussion concerns storage processor 100, this is for illustrative purposes only and is not intended to be a limitation of this disclosure, as other configurations are possible and are considered to be within the scope of this disclosure. For example, such a communication fabric (e.g., PCIe fabric 200) may be utilized to link together the individual subsystems/modules of data array 112 alone, or in combination with the individual subsystems/modules of storage processor 100. Additionally/alternatively, such a communication fabric (e.g., PCIe fabric 200) may be utilized to link together the individual subsystems/modules within any general purpose computing device.

As discussed above, PCIe fabric 100 may be configured to couple a plurality of elements (e.g., plurality of elements 202) within (in this example) storage processor 100. In this example, plurality of elements 202 may include components of a data storage system (e.g., storage system 12 generally and, in this specific example, storage processor 100).

Plurality of elements 202 may include one or more host elements (e.g., host elements 204, 206, 208, 210, 212, 214, 216, 218), example of which may include but are not limited to: one or more compute modules Additionally/alternatively, plurality of elements 202 may include one or more endpoint elements (e.g., endpoint elements 220, 222, 224, 226, 228, 230, 232, 234), examples of which may include but are not limited to: one or more host bus adaptors; SAS controllers; SAS hard disk drives; fiber channel adapters; Ethernet adapters; PCIe flash memory devices; one or more InfiniBand (IB) adapters; one or more RAID adapters; one or more network adapters; and one or more general purpose graphics processing units PCIe fabric 200 may include a plurality of PCIe subfabrics. Each of the plurality of PCIe subfabrics (e.g., PCIe subfabrics 236, 238, 240, 242) may include: a managing central processing unit and a PCIe fabric switch. For example: PCIe subfabric 236 is shown to include managing central processing unit 244 and PCIe fabric switch 246; PCIe subfabric 238 is shown to include managing central processing unit 248 and PCIe fabric switch 250; PCIe subfabric 240 is shown to include managing central processing unit 252 and PCIe fabric switch 254; and PCIe subfabric 242 is shown to include managing central processing unit 256 and PCIe fabric switch 258. An example of managing central processing units 244, 248, 252, 256 may include but is not limited to an x86 compute module.

One or more communication paths may be configured to allow communication between the PCIe fabric switch included within each of the plurality of PCIe subfabrics. For example, communication path 260 is shown to be configured to allow communication between PCIe fabric switch 246 within PCIe subfabric 236 and PCIe fabric switch 250 within PCIe subfabric 238. Further, communication path 262 is shown to be configured to allow communication between PCIe fabric switch 250 within PCIe subfabric 238 and PCIe fabric switch 254 within PCIe subfabric 240. Additionally, communication path 264 is shown to be configured to allow communication between PCIe fabric switch 254 within PCIe subfabric 240 and PCIe fabric switch 258 within PCIe subfabric 242.

Primary master central processing system 266 may be configured to couple the plurality of PCIe subfabrics (e.g., PCIe subfabrics 236, 238, 240, 242) and may include a primary master central processing unit (e.g., primary master central processing unit 268). An example of primary master central processing unit 268 may include but is not limited to an x86 compute module.

Additionally and in certain configurations, primary master central processing system 266 may include primary fan-out switch 270 that may be configured to electrically couple master central processing unit 268 and the plurality of PCIe subfabrics (e.g., PCIe subfabrics 236, 238, 240, 242). An example of primary fan-out switch 270 may include but is not limited to a PCIe fan-out switch. For example, if PCIe fabric 200 includes a limited number of PCIe subfabrics (e.g., PCIe subfabrics 236, 238), primary master central processing unit 268 may be configured to e.g., include two network adapters so that PCIe subfabrics 236, 238 may be directly coupled to primary master central processing unit 268. Alternatively and if PCIe fabric 200 includes a large number of PCIe subfabrics (e.g., PCIe subfabrics 236, 238, 240, 242 or more), primary master central processing unit 268 and all of the PCIe subfabrics (e.g., PCIe subfabrics 236, 238, 240, 242 or more) may be coupled through primary fan-out switch 270.

While PCIe fabric 200 is shown to include four PCIe subfabrics (e.g., PCIe subfabrics 236, 238, 240, 242), this is for illustrative purposes only and is not intended to be a limitation of this disclosure, as other configurations are possible. For example and referring also to FIG. 4, PCIe fabric 200 is shown to include four PCIe subfabrics (e.g., PCIe subfabrics 236, 238, 240, 242, 300, 302, 304, 306).

Figure 4:
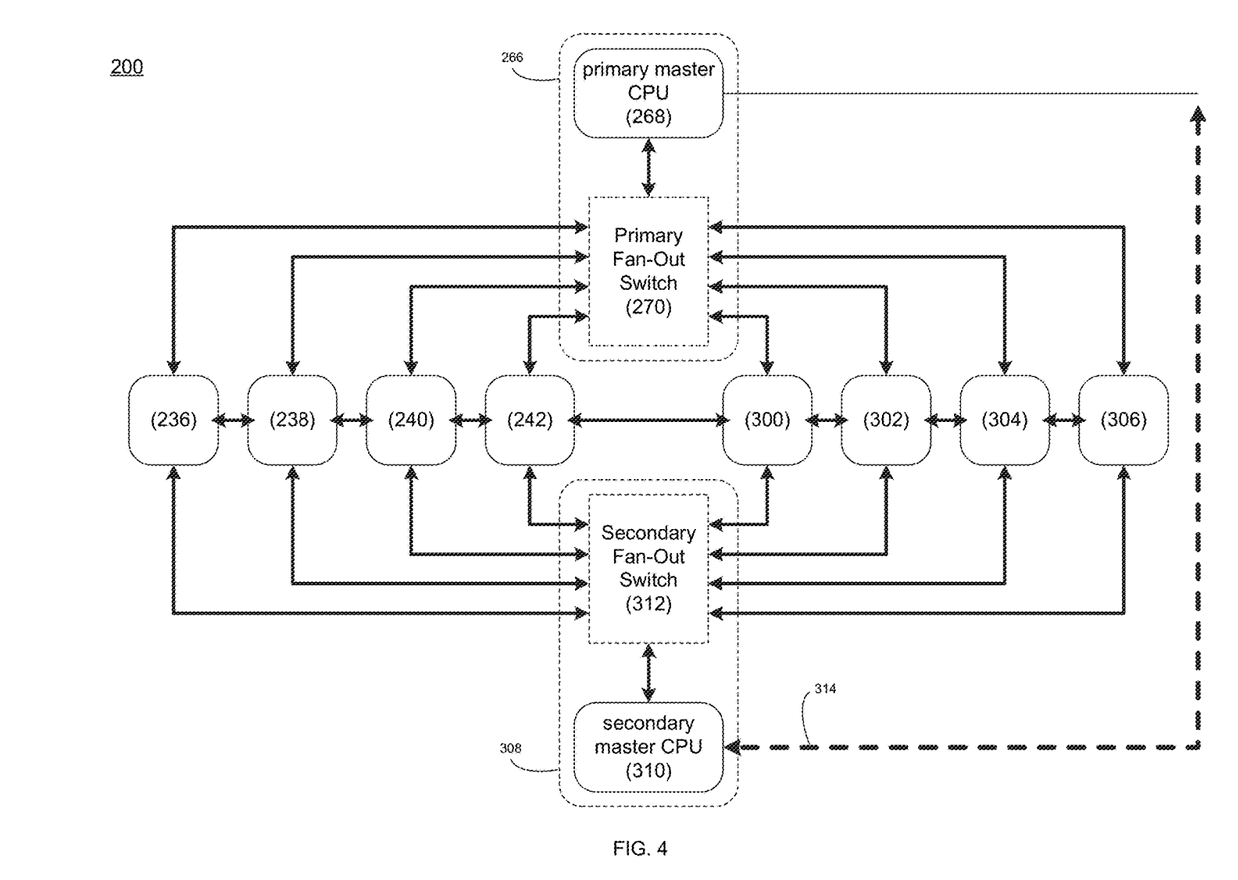
FIG. 4 is a diagrammatic view of an alternative embodiment of the storage processor of FIG. 2.

Higher levels of redundancy/high availability may be achieved by including secondary master central processing system 308. Secondary master central processing system 308 may be configured to couple the plurality of PCIe subfabrics (e.g., PCIe subfabrics 236, 238, 240, 242, 300, 302, 304, 306) and may include secondary master central processing unit 310. An example of secondary master central processing unit 310 may include but is not limited to an x86 compute module.

Secondary master central processing system 308 may be configured to operate in standby mode so that, in the event of a failure of primary master central processing system 266, secondary master central processing system 308 may be ready to perform the operations previously done by the failed primary master central processing system 266

Additionally and in certain configurations, secondary master central processing system 308 may also include secondary fan-out switch 312 that may be configured to electrically couple secondary master central processing unit 310 and the plurality of PCIe subfabrics (e.g., PCIe subfabrics 236, 238, 240, 242, 300, 302, 304, 306). An example of secondary fan-out switch 312 may include but is not limited to a PCIe fan-out switch. For example, if PCIe fabric 200 includes a limited number of PCIe subfabrics (e.g., PCIe subfabrics 236, 238), secondary master central processing unit 310 may be configured to e.g., include two network adapters so that PCIe subfabrics 236, 238 may be directly coupled to secondary master central processing unit 310. Alternatively and if PCIe fabric 200 includes a large number of PCIe subfabrics (e.g., PCIe subfabrics 236, 238, 240, 242, 300, 302, 304, 306), secondary master central processing unit 310 and all of the PCIe subfabrics (e.g., PCIe subfabrics 236, 238, 240, 242, 300, 302, 304, 306) may be coupled through secondary fan-out switch 312.

Operation of the Fabric:

As discussed above and referring again to FIG. 3, fabric management process 10 may reside on and may be executed by storage system 12 and may be configured to administer, configure and operate PCIe fabric 200. For example, fabric management process 10 may be configured to allow an administrator (not shown) to define and configure plurality of elements 202.

As discussed above, plurality of elements 202 may include one or more host elements (e.g., host elements 204, 206, 208, 210, 212, 214, 216, 218), example of which may include but are not limited to: one or more compute modules. Additionally/alternatively, plurality of elements 202 may include one or more endpoint elements (e.g., endpoint elements 220, 222, 224, 226, 228, 230, 232, 234), examples of which may include but are not limited to: one or more host bus adaptors; SAS controllers; SAS hard disk drives; fiber channel adapters; Ethernet adapters; PCIe flash memory devices; one or more InfiniBand (IB) adapters; one or more RAID adapters; one or more network adapters; and one or more general purpose graphics processing units.

When fabric management process 10 is utilized to define and configure plurality of elements 202, fabric management process 10 may be configured to allow an administrator (not shown) to pair host elements with endpoint elements. For example, if host element 204 is a compute module, fabric management process 10 may allow an administrator to pair host element 204 with endpoint element 224, which may be a general purpose graphics processing units. Accordingly, the compute module (e.g., host element 204) may offload graphical processing tasks to the general purpose graphics processing unit (e.g., endpoint element 224).

Typically and within PCIe fabric 200, one or more of host elements 204, 206, 208, 210, 212, 214, 216, 218 may access one or more of endpoint elements 220, 222, 224, 226, 228, 230, 232, 234. When more than one of host elements 204, 206, 208, 210, 212, 214, 216, 218 wants to access the same endpoint element (e.g., endpoint element 220, 222, 224, 226, 228, 230, 232 or 234) and assuming that the target endpoint element (e.g., endpoint element 220, 222, 224, 226, 228, 230, 232 or 234) supports simultaneous access from multiple host elements, special driver software may be needed to handle such an arrangement. In one such example, host elements 204 and 206 may utilize endpoint element 224. In order to support this configuration, primary master central processing unit 268 may send a command to managing central processing unit 248 (which manages PCIe Switch 250 that manages endpoint element 224) to load physical function driver software for endpoint element 224.

The above-described operation may be necessary because endpoint devices that are running in a shared I/O mode may need to have a central point of contact that manages configuration cycles on behalf of the endpoint. When devices that are using virtual functions generate config cycles, which are typically used during PCIe enumeration that occurs at boot time and after a reset, then the config cycles may be directed to the entity running the physical function driver, and that device may generates the real config cycles that may then sent to the target endpoint.

Primary master central processing unit 268 may then send commands to managing central processing unit 244, which manages PCIe Switch 246 that manages host elements 204 and 206, to assign endpoint 224 virtual functions to host elements 204 and 206. Subsequent to assigning these virtual functions, host endpoints 204, 206 may load driver software necessary to utilize endpoint 224.

In the above-described example, several operations may occur. The primary master central processing unit 268 may discover the entire PCIe fabric including all of the host devices and endpoint devices, which may be accomplished by polling each of managing central processing units 244, 248, 252, 256. The primary master central processing unit 268 may share the topology information about the entire PCIe fabric with each of managing central processing units 244, 248, 252, 256. When an external entity (e.g., an end user) wants to create a new logical server, they may indicate the specific elements that they would like to bind together.

When an endpoint device supports "shared i/o" functionality', multiple host elements may use the endpoint simultaneously. And when primary master central processing unit 268 is commanded to bind an endpoint element to multiple host elements, one of several things may occur:

If the endpoint element does not support 'shared i/o', the command will fail and an error will be returned.

If the endpoint supports 'shared i/o' but all of its available virtual functions are consumed, the command will fail and an error will be returned.

If the endpoint supports 'shared i/o' and there is an available virtual function, the bind command will succeed.

To bind elements within the fabric together, primary master central processing unit 268 may send commands to managing central processing unit 244, 248, 252, 256, which will send commands to the PCIe switches 246, 250, 254, 258. PCIe switches 246, 250, 254, 258 may then update the configuration of the entire PCIe fabric to make connections between the elements being bound together.

Communication paths 260, 262, 264 may be configured to allow the various PCIe subfabrics (e.g., PCIe subfabrics 236, 238, 240, 242) to communicate with each other. As discussed above, the compute module (e.g., host element 204) may offload graphical processing tasks to the general purpose graphics processing unit (e.g., endpoint element 224). Accordingly, the compute module (e.g., host element 204) may generate data for offloading to the general purpose graphics processing unit (e.g., endpoint element 224), wherein this data is packetized and provided from PCIe subfabric 236 to PCIe subfabric 238 via communication path 260.

Figures 5A, 5B:
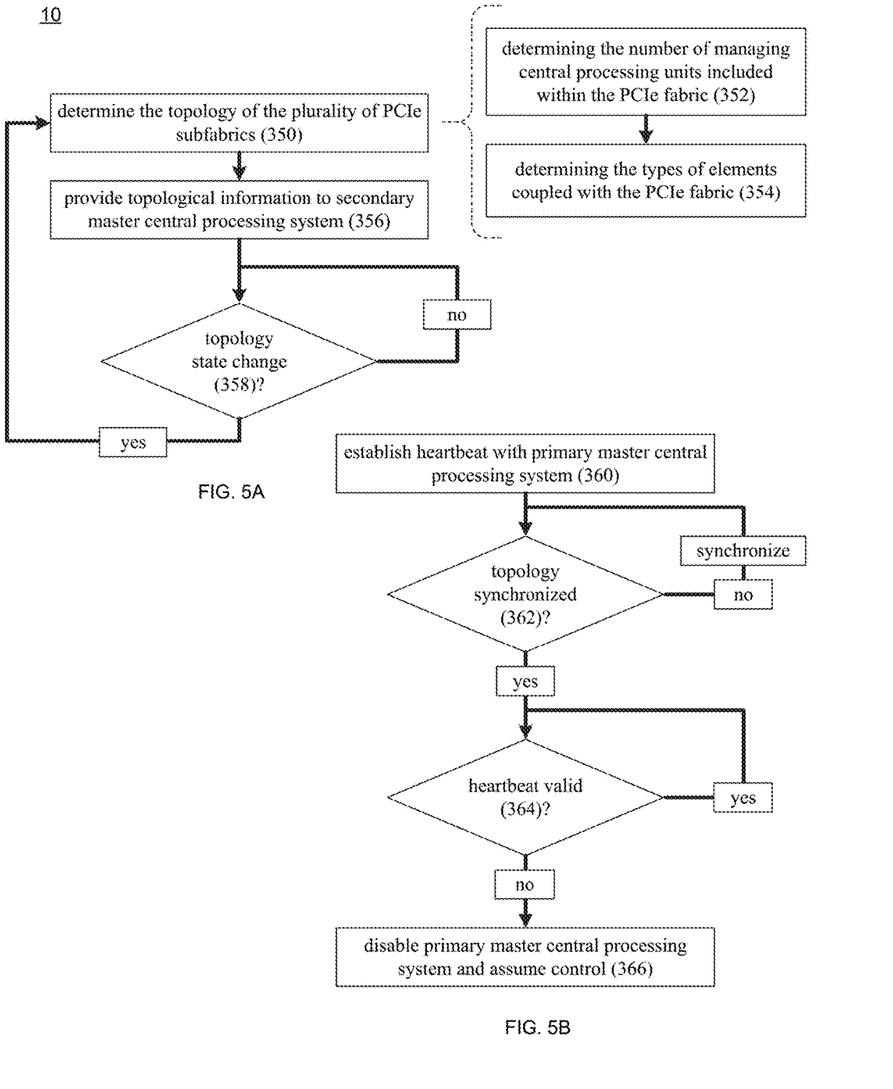
FIG. 5A is a flow chart of a first portions of the fabric management process of FIG. 1.
FIG. 5B is a flow chart of a second portions of the fabric management process of FIG. 1.

Referring also to FIG. 5A and upon startup, fabric management process 10 may instruct primary master central processing system 266 to determine 350 the topology of the plurality of PCIe subfabrics (e.g., PCIe subfabrics 236, 238, 240, 242), wherein determining 350 the topology of the plurality of PCIe subfabrics (e.g., PCIe subfabrics 236, 238, 240, 242) may include determining 352 the number of managing central processing units included within PCIe fabric 200 and determining 354 the types of elements coupled within PCIe fabric 200. Accordingly and upon startup, fabric management process 10 may determine 352 that PCIe fabric 10 includes (in this example) four managing central processing units (namely managing central processing units 244, 248, 254, 258) and may also determine 354 that elements 204, 206, 208, 210, 212, 214, 216, 218 are host elements, while elements 220, 222, 224, 226, 228, 230, 232, 234 are end point elements.

Once the above-described topology of the plurality of PCIe subfabrics (e.g., PCIe subfabrics 236, 238, 240, 242) is determined 350 by (in this example) primary master central processing system 266, fabric management process 10 may provide 356 this topological information concerning the plurality of PCIe subfabrics (e.g., PCIe subfabrics 236, 238, 240, 242) to secondary master central processing system 308 so that, in the event that primary master central processing system 266 fails (as discussed above), secondary master central processing system 308 may utilize the above-described topological information and be ready to perform the operations previously done by the failed primary master central processing system 266. Additionally, fabric management process 10 may routinely check to determine 358 if the topology of the plurality of PCIe subfabrics (e.g., PCIe subfabrics 236, 238, 240, 242) has changed and, if so, the new topological information may be determined 350 and may be provided 356 to secondary master central processing system 308.

Additionally and referring also to FIG. 5B, fabric management process 10 may instruct secondary master central processing system 308 to establish 360 heartbeat connection 314 with primary master central processing system 266. Fabric management process 10 may also routinely determine 362 if the topology of the plurality of PCIe subfabrics (e.g., PCIe subfabrics 236, 238, 240, 242) is synchronized and, if not, fabric management process 10 may synchronize the topological information (in the manner described above). If the topological information is synchronized, fabric management process 10 may routinely monitor the status of heartbeat connection 314 with primary master central processing system 266 to determine 364 if heartbeat connection 314 is valid. If not, fabric management process 10 may disable 366 primary master central processing system 266 and have secondary master central processing system 308 assume control.

As discussed above, communication paths 260, 262, 264 may be configured to allow the various PCIe subfabrics (e.g., PCIe subfabrics 236, 238, 240, 242) to communicate with each other. For example, the compute module (e.g., host element 204) may generate data for offloading to the general purpose graphics processing unit (e.g., endpoint element 224), wherein this data may be packetized and provided from PCIe subfabric 236 to PCIe subfabric 238 via communication path 260. Additionally, other types of housekeeping and/or control data may be provided between the various elements within PCIe subfabrics 236, 238, 240, 242.

Accordingly and in order to provide a higher level of availability, the various PCIe subfabrics may be configured to enable multipath communication with each other. For example, a first element (e.g., host element 204) coupled to a first PCIe subfabric (e.g., PCIe subfabric 236) may communicate (using multiple communication paths) with a second element (e.g., endpoint element 224) coupled to a second PCIe subfabric (e.g., PCIe subfabric, 238). Accordingly, in the event that a first communication path fails, data communication may be effectuated using a second communication path.

Referring also to FIG. 6A and again to FIG. 3, assume that host element 204 (which is coupled to PCIe subfabric 236) needs to transmit data 272 to endpoint element 224 (which is coupled to PCIe subfabric 238). Accordingly, fabric management process 10 may transmit 400 a data portion (e.g., data 272) from the first element (e.g., host element 204) to the second element (e.g., endpoint element 224) via a first communication path, wherein an example of this first communication path is communication path 260, which is illustrated as transmitting a first copy of data 272 (namely data 272a).

Figure 6A:
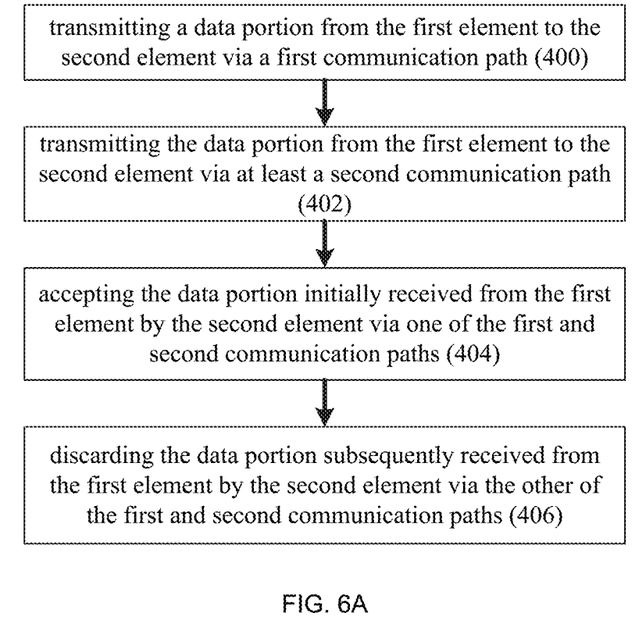
FIG. 6A is a flow chart of a third portion of the fabric management process of FIG. 1.

Further, fabric management process 10 may transmit 402 (e.g., simultaneously or quasi-simultaneously) the data portion (e.g., data 272) from the first element (e.g., host element 204) to the second element (e.g., endpoint element 224) via at least a second communication path, wherein an example of this at least a second communication path is the communication path formed by communication paths 274, 276 and primary fan-out switch 270, which is illustrated as transmitting a second copy of data 272 (namely data 272b).

Accordingly, in the event that e.g., one of the two communication paths fails, the data will still be delivered using another communication path. Therefore, fabric management process 10 may accept 404 the data portion initially received from the first element (e.g., host element 204) by the second element (e.g., endpoint element 224) via one of the first and second communication paths and may discard 406 the data portion subsequently received from the first element (e.g., host element 204) by the second element (e.g., endpoint element 224) via the other of the first and second communication paths. Accordingly, assume that data 272a arrives at endpoint element 224 prior to data 272b. Therefore, fabric management process 10 may accept 404 data 272a received from host element 204 by endpoint element 224 via communication path 260 and may discard 406 data 272b subsequently received from host element 204 by endpoint element 224 via the second communication path formed by communication path 274, 276 and primary fan-out switch 270.

Figure 6B:
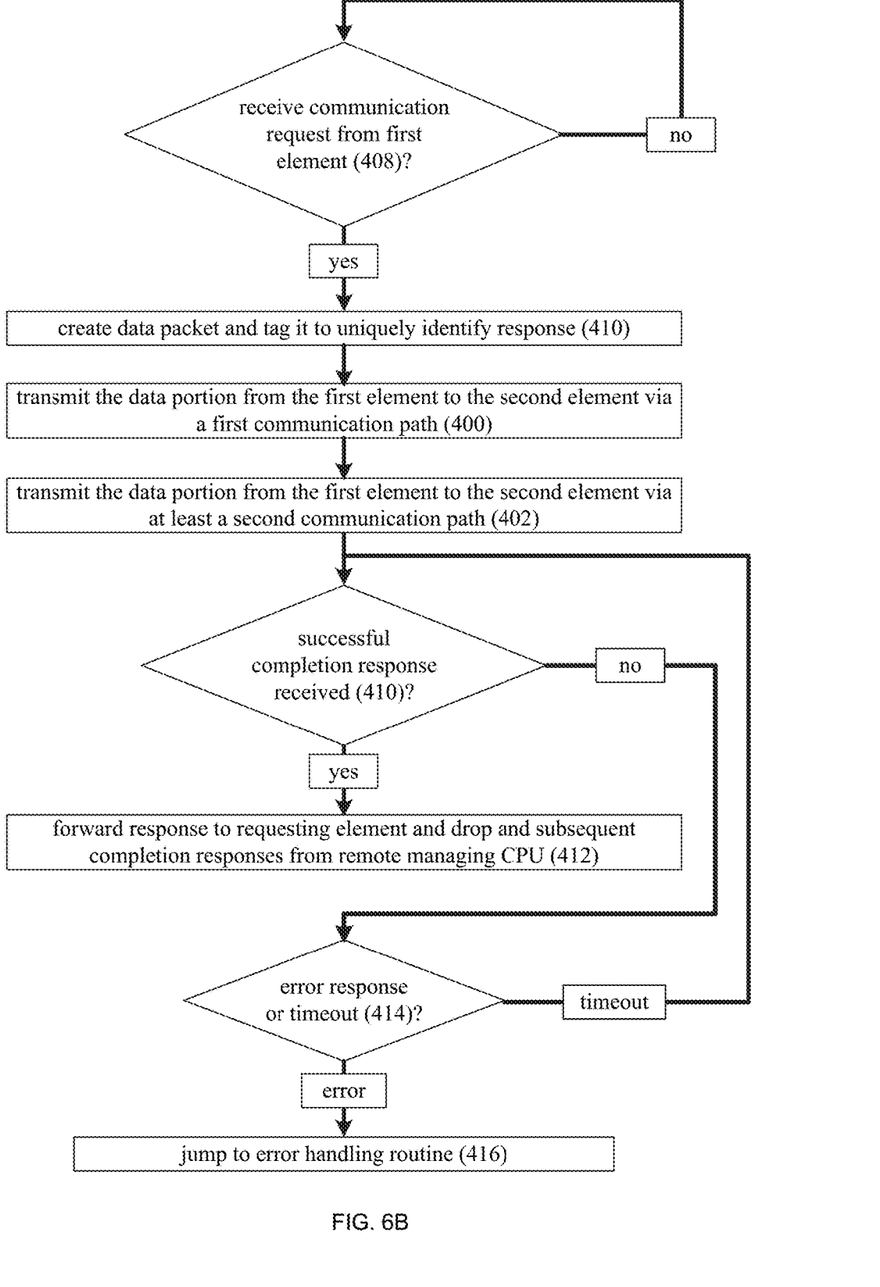
FIG. 6B is a flow chart of a fourth portion of the fabric management process of FIG. 1.

Referring also to FIG. 6B and adding additional detail to the above-described process, when managing CPU 244 receives 408 a communication request from the first element (e.g., host element 204), fabric management process 10 may create 410 a data packet and may tag the data packet to uniquely identify the response. Fabric management process 10 may then transmit 400 data 272 from host element 204 to endpoint element 224 via a first communication path (e.g., communication path 260), which is illustrated as transmitting a first copy of data 272 (namely data 272a). Fabric management process 10 may then transmit 402 (e.g., simultaneously or quasi-simultaneously) data 272 from host element 204 to endpoint element 224 via at least a second communication path (e.g., the communication path formed by communication paths 274, 276 and primary fan-out switch 270), which is illustrated as transmitting a second copy of data 272 (namely data 272b).

Fabric management process 10 may then determine 410 if a successful completion response was received from endpoint element 224. If yes, fabric management process 10 may forward 412 a response to the requesting element (e.g., host element 204) and drop any subsequent completion responses from the remote managing CPU (e.g., managing CPU 248). If no, fabric management process 10 may determine 414 if an error response or a timeout was generated.

If a timeout was generated, fabric management process 10 may continue to wait for receipt of a successful completion response. If an error was received, fabric management process 10 may initiate 416 an error handling routine.

Figure 6C:
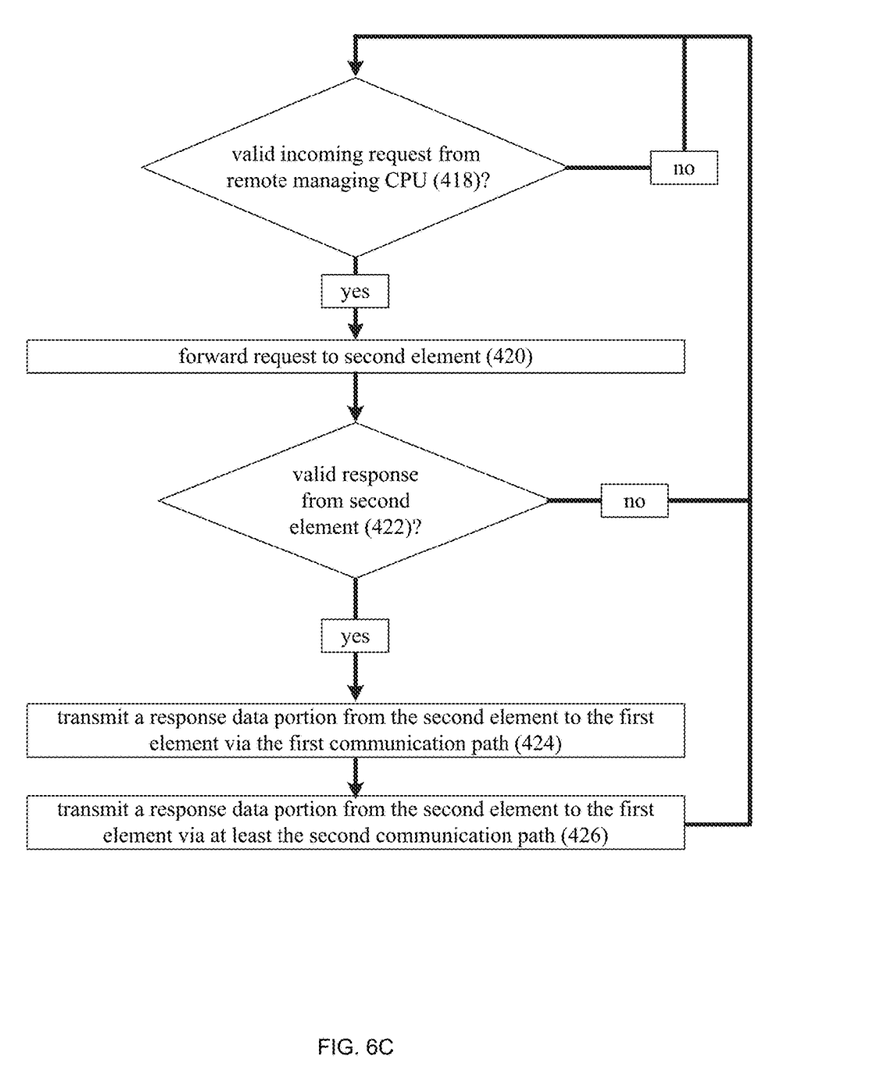
FIG. 6C is a flow chart of a fifth portion of the fabric management process of FIG. 1.

Referring also to FIG. 6C and adding additional detail to the above-described process, when managing CPU 248 (e.g., the managing CPU associated with endpoint element 224) receives 418 a valid incoming request from a remote managing CPU (e.g., managing CPU 244), fabric management process 10 may forward 420 the request to second element (e.g., endpoint element 224). Fabric management process 10 may then determine 422 if a valid response was received from the second element (e.g., endpoint element 224). If a valid response was not received, fabric management process 10 may again monitor for incoming requests from a remote managing CPU. And if a valid response was received, fabric management process 10 may transmit 424 a response data portion from the second element (e.g., endpoint element 224) to the first element (e.g., host element 204) via the above-described first communication path and may transmit 426 a response data portion from the second element (e.g., endpoint element 224) to the first element (e.g., host element 204) via the above-described at least the second communication path.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a standalone software package, partly on the user's computer and partly on a remote computer or entirely on the remote computer or server. In the latter scenario, the remote computer may be connected to the user's computer through a local area network/a wide area network/the Internet (e.g., network 18).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A Peripheral Component Interconnect Express (PCIe) fabric configured to couple a plurality of elements, the PCIe fabric comprising:
   a plurality of PCIe subfabrics each comprising a managing central processing unit; and
   a primary master central processing system configured to couple the plurality of PCIe subfabrics and including a primary master central processing unit, wherein the primary master central processing system is configured to:
   determine the topology of the plurality of PCIe subfabrics, wherein determining the topology of the plurality of PCIe subfabrics includes: determining a number of managing central processing units included within the PCIe fabric, and determining the types of elements coupled with the PCIe fabric,
   determine the topology of the entire PCIe fabric based upon, at least in part, the topology of the plurality of PCIe subfabrics, and share the topology of the entire PCIe fabric with each of the plurality of PCI subfabrics.

2. The PCIe fabric of claim 1 wherein the primary master central processing system includes:
   a primary fan-out switch configured to electrically couple the primary master central processing unit and the plurality of PCIe subfabrics.

3. The PCIe fabric of claim 1 further comprising:
   a secondary master central processing system configured to couple the plurality of PCIe subfabrics and including a secondary master central processing unit.

4. The PCIe fabric of claim 3 wherein the secondary master central processing system includes:
   a secondary fan-out switch configured to electrically couple the secondary master central processing unit and the plurality of PCIe subfabrics.

5. The PCIe fabric of claim 1 wherein each of the plurality of PCIe subfabrics includes further comprise:
   a managing central processing unit, and a PCIe fabric switch.

6. The PCIe fabric of claim 5 further comprising:
   one or more communication paths configured to allow communication between the PCIe fabric switch included within each of the plurality of PCIe subfabrics.

7. The PCIe fabric of claim 1 wherein the plurality of elements include components of a data storage system.

8. The PCIe fabric of claim 1 wherein the plurality of elements includes one or more host elements.

9. The PCIe fabric of claim 8 wherein the one or more host elements include one or more compute modules.

10. The PCIe fabric of claim 1 wherein the plurality of elements includes one or more endpoint elements.

11. The PCIe fabric of claim 10 wherein the one or more endpoint elements include one or more of:
    one or more host bus adaptors;
    Serial Attached Small Computer System Interface (SAS) controllers;
    SAS hard disk drives;
    fiber channel adapters;
    Ethernet adapters;
    PCIe flash memory devices;
    one or more InfiniBand (IB) adapters;
    one or more Redundant Array of Independent Disks (RAID) adapters;
    one or more network adapters; and
    one or more general purpose graphics processing units.

12. A Peripheral Component Interconnect Express (PCIe) fabric configured to couple a plurality of elements, the PCIe fabric comprising:
    a plurality of PCIe subfabrics; and
    a primary master central processing system configured to couple the plurality of PCIe subfabrics and including a primary master central processing unit and a primary fan-out switch configured to electrically couple the primary master central processing unit and the plurality of PCIe subfabrics;
    wherein each of the plurality of PCIe subfabrics includes:
    a managing central processing unit, and a PCIe fabric switch; and
    wherein the primary master central processing system is configured to: determine the topology of the plurality of PCIe subfabrics, wherein determining the topology of the plurality of PCIe subfabrics includes:
    determining a number of managing central processing units included within the PCIe fabric, and
    determining the types of elements coupled with the PCIe fabric,
    determine the topology of the entire PCIe fabric based upon, at least in part, the topology of the plurality of PCIe subfabrics, and share the topology of the entire PCIe fabric with each managing central processing unit of the plurality of PCI subfabrics.

13. The PCIe fabric of claim 12 further comprising:
    one or more communication paths configured to allow communication between the PCIe fabric switch included within each of the plurality of PCIe subfabrics.

14. The PCIe fabric of claim 12 further comprising:
    a secondary master central processing system configured to couple the plurality of PCIe subfabrics and including a secondary master central processing unit.

15. The PCIe fabric of claim 14 wherein the secondary master central processing system includes:
    a secondary fan-out switch configured to electrically couple the secondary master central processing unit and the plurality of PCIe subfabrics.

16. A Peripheral Component Interconnect Express (PCIe) fabric configured to couple a plurality of elements, the PCIe fabric comprising:
    a plurality of PCIe subfabrics;
    a primary master central processing system configured to couple the plurality of PCIe subfabrics and including a primary master central processing unit and a primary fan-out switch configured to electrically couple the primary master central processing unit and the plurality of PCIe subfabrics, wherein the primary master central processing system is configured to: determine the topology of the plurality of PCIe subfabrics, wherein determining the topology of the plurality of PCIe subfabrics includes: determining a number of managing central processing units included within the PCIe fabric, and determining the types of elements coupled with the PCIe fabric,
    determine the topology of the entire PCIe fabric based upon, at least in part, the topology of the plurality of PCIe subfabrics, and share the topology of the entire PCIe fabric with each of the plurality of PCI subfabrics;
    a secondary master central processing system configured to couple the plurality of PCIe subfabrics and including a secondary master central processing unit and a secondary fan-out switch configured to electrically couple the secondary master central processing unit and the plurality of PCIe subfabrics; and one or more communication paths configured to allow communication between the PCIe fabric switch included within each of the plurality of PCIe subfabrics.

17. The PCIe fabric of claim 16 wherein the plurality of elements includes one or more host elements.

18. The PCIe fabric of claim 16 wherein the plurality of elements includes one or more endpoint elements.

* * * * *